United States Patent [19]
Jaeger et al.

[11] 3,916,532
[45] Nov. 4, 1975

[54] METHOD FOR PRODUCING PARTICULATE MATERIAL BY FREEZE DRYING

[75] Inventors: Raymond Edward Jaeger, Basking Ridge; Thomas John Miller, Green Brook, both of N.J.

[73] Assignee: Bell Telephone Laboratories, Incorporated, Murray Hill, N.J.

[22] Filed: Jan. 7, 1974

[21] Appl. No.: 431,122

Related U.S. Application Data

[63] Continuation-in-part of Ser. No. 180,505, Sept. 14, 1971, abandoned.

[52] U.S. Cl. ..................................................... 34/5
[51] Int. Cl.² ......................................... F26B 5/06
[58] Field of Search .................................... 34/5, 92

[56] References Cited
UNITED STATES PATENTS 3,281,950  11/1966  Kautz ........................................ 34/5
3,516,935  6/1970  Monforte et al. ......................... 34/5

Primary Examiner—John J. Camby
Attorney, Agent, or Firm—E. B. Cave; G. S. Indig

[57] ABSTRACT

Freeze drying of aqueous metal salt solutions of a type or concentration not ordinarily susceptible to freeze drying by sublimation of frozen droplets is accomplished by adding ammonium hydroxide, a substituted ammonium hydroxide or a salt of ethylene diamine tetraacetic acid. The additive raises the freezing point of the solution and also reduces the tendency of solutions to supercool. With these additives, solutions of salts such as ferric sulfate can be freeze dried in more concentrated forms, which ordinarily supercool, and a product thus obtained which upon calcining, produces a more dense oxide than can be produced by the calcining of the freeze dried product of more dilute solutions.

8 Claims, No Drawings

METHOD FOR PRODUCING PARTICULATE MATERIAL BY FREEZE DRYING

CROSS REFERENCE TO RELATED APPLICATION

This application is a continuation-in-part of our co-pending application, Ser. No. 180,505, filed Sept. 14, 1971, now abandoned.

BACKGROUND OF THE INVENTION

1. Fiefd of the Invention

This invention relates to the freeze-drying of aqueous metal salt solutions, and to such freeze-drying to produce dried particulate material.

2. Prior Art

In U.S. Pat. No. 3,551,533 and U.S. Pat. No. 3,516,935 both assigned to the assignee of this invention, there is described a method for producing particulate material exemplified by the steps of preparing a solution of metal salts capable of producing a desired composition, atomizing the solution into droplets, freezing the droplets at a rate sufficient to prevent substantial coalescence, and removal of the solvent by sublimation.

While this approach is applicable in principle to any solution, regardless of the concentration of solute material therein, in practice attempts to increase the yield of particulate material by increasing the concentration of solute have in certain cases met with difficulties. For example, increasing the concentration tends to depress the freezing point of these solutions, sometimes significantly, resulting in the necessity for reducing the temperature of the refrigerant, or even replacing the refrigerant with one more suitable to the lower temperatures required in order to maintain freezing rates adequate to prevent coalescence of the freezing droplets.

Furthermore, some metal salt solutions have a tendency to supercool under these conditions, which tendency in general increases with increasing concentration. The result is often frozen droplets containing a glass-like phase, from which it has been found to be impossible to remove solvent by sublimation. Under these conditions, melting is a prerequisite to solvent removal, thus leading to agglomeration of the particles and segregation of the salts therein. These problems have effectively prevented the achievement of significantly increased yields of particulate material by the freeze-drying technique for some commercially significant solute systems.

In addition to the savings in energy, apparatus, etc., in the freeze-drying process which would result from an increased yield in the particulate product, other significant advantages would also be expected. For example, the freeze-dried product of relatively dilute solutions tends to be porous and sponge-like. Where such a product is to be formed into a compacted body of polycrystalline material, compaction to the desired density is sometimes difficult to achieve.

It is expected that increasing the yield of such freeze-dried solutions would lead to a more dense product, thus greatly facilitating compaction.

SUMMARY OF THE INVENTION

The freeze-drying of aqueous metal salt solutions is facilitated by the presence of one or more of the additives ammonium hydroxide, tetraalkyl ammonium hydroxide, and the salts of ethylene diamine tetraacetic acid (EDTA), which raise the freezing points of the solutions and promote crystal formation and crystal-solvent phase separation in freezing droplets of the solution, thus preventing supercooling of the solution during freezing, and melting of the frozen droplets during drying, regardless of solution concentration.

In addition to enabling the freeze-drying of certain salt solutions for the first time, the presence of one or more of these additives enables significant increases in the yield of many salts by enabling the freeze-drying of more concentrated solutions than could heretofore be obtained by freeze-drying, leading to significant increases in the density of the resultant particulate product, thus facilitating, for example, formation into compacts.

The additives also raise the freezing point of the solution, thus facilitating freezing.

While it is often contemplated to prepare a freeze-dried product of a desired composition (e.g., metal, alloy, refractory oxide, glass or other ceramic) by preparing a solute system capable of producing that composition, the particulate product may find other uses, such as in filter beds, catalyst supports, abrasives, etc.

DETAILED DESCRIPTION

The freeze-drying technique to which the present invention is applicable has been described elsewhere, in U.S. Pat. Nos. 3,551,533 and 3,516,935, assigned to the present assignee, and reference is made to these patents for details of operation. However, as an aid to the practitioner, the procedure is briefly summarized herein.

FORMATION OF SOLUTION

The solute material, which may be a single component or multicomponent, if soluble in water in its final desired form may be utilized as such in the solution.

Where the final desired form is not soluble, soluble components capable of yielding the desired composition after drying must be selected. Many metal oxides are essentially insoluble in water. Thus the corresponding water soluble metal sulfates, carbonates, nitrates, nitrites, oxalates, acetates, formates, etc. may be selected as starting materials. The conversion to the final desired form can be made by thermal decomposition, chemical reduction, or reaction. Thermal decomposition, for example, is brought about when one solid compound is heated to obtain a different solid compound with the evolution of a gas. In general, as is known, thermal decomposition of the sulfates, carbonates, nitrates, nitrites, oxalates, acetates and formates may be carried out within the range of 200°C to 1,200°C. By way of example, thermal decomposition of sulfates may, depending on cation species, be carried out within the range of 400°C to 1,200°C to achieve the reaction $MSO_4 \rightarrow MO + SO_3$, where M is a metal.

It is an advantage of the procedure that mixing of multicomponent salt systems occurs on a molecular scale by dissolution in the solvent. Such mixing may be accelerated by mechanical stirring and/or heating, particularly where concentrations near the saturation limit are desired. However, other advantages such as high reactivity of the particles inure regardless of whether the solute is a single salt or multicomponent.

It is sometimes indicated to buffer or otherwise adjust the pH of the solution with a view to stabilize the solution, as is well known.

DROPLET FORMATION

Depending upon the final use envisioned, droplet formation may or may not be necessary. Bulk mixing of the solution with a liquid refrigerant, for example, will often result in the formation of globules of solution therein, which may result in commercially expedient freezing and drying rates. Higher rates may be achieved by stirring to break up the globules. However, where a highly uniform finely divided product is desired, droplet formation is required. Formation of droplets may take any conventional form, for example, forcing the solution through an orifice. Alternative procedures include interaction of a rotated disc or air currents with a stream.

FREEZING

Where a homogeneous multicomponent end product is desired, freezing must be carried out with sufficient rapidity to prevent substantial coalescence or segregation. Generally, it has been found that freezing within a period of one second or less with a preferred time of 0.05 second or less assures adequate particle integrity and compositional homogeneity.

In general, the requirements are that no deleterious reaction occur between the refrigerant and the solution and that the refrigerant and solution be substantially immiscible. Suitable liquid refrigerants include liquid isoheptane, liquid nitrogen, hexane, cumene and dimethylbutane. Gaseous refrigerants may be used although in general they result in slower freezing rates. Solution-to-liquid refrigerant volume ratios found to be suitable in practice to prevent substantial coalescence and to achieve adequate freezing rate and heat capacity of the refrigerant range from 1:2 to 1:100.

Stirring may be desired in that it results in greater efficiency of the refrigerant, avoids localized heating and possible segregation of solute in multicomponent systems.

COLLECTION OF FROZEN DROPLETS

Collection may be carried out in a variety of ways. Where the frozen droplets are more dense than the refrigerant, they may collect at the bottom of the vessel and may be recovered by decanting the refrigerant. If the frozen droplets are less dense than the refrigerant, they may rise to the surface and may be collected there. Collection should, of course, be at a temperature lower than that of the freezing point of the solution. Avoiding deep collection containers such as might result in an excessive weight of collected frozen droplets will in general prevent particle agglomeration.

SUBLIMATION

It is critical that essentially no part of the solution be permitted to exist in the liquid phase during this step, i.e., that solvent be removed from the droplets by sublimation. It is also generally desirable to remove the solvent as quickly as possible. Limiting conditions include the maximum rate at which heat may be introduced into the system as well as the maximum rate at which solvent vapor may be removed.

It is generally desirable to carry out sublimation at pressures well below the equilibrium triple point and no greater than about 1 millimeter of mercury. Lower pressures are preferred since they result in an increased sublimation rate. While sublimation at room temperature is adequate to achieve the particulate product of the invention, it may be desired to add heat to the system during sublimation in order to achieve commercially expedient sublimation rates.

CONVERSION

Depending upon the composition and the final use envisioned, conversion may or may not be necessary. Where it is desired to form a body of oxidic materials, for example, the conversion may expediently take the form of a thermal decomposition. The only requirement is that the temperature be above the decomposition temperature. It has been found that higher temperatures or longer times may result in increased particle size, which may be of concern in the formation of extremely fine structures.

FORMING

Forming, which can include comminution or formation of a compact, or both, may or may not be carried out, depending upon the composition and final use envisioned. Comminution may often be carried out simply by crushing, for example, by forcing through a screen or by treating in a colloid mill.

Formation of a compact is usually carried out by pressing, hot pressing, isostatic pressing, etc. The usual binders known to be useful in such operation may be employed. For higher concentrations of solute, porosity will be somewhat diminished, thus facilitating compaction.

SINTERING

Sintering of a compact to form a polycrystalline body or melting the particulate material to form a glass may be carried out using the conventional times and temperatures associated with the selected compositions. However, the uniform, finely-divided product which is characteristic of the freeze-drying process usually enables the use of less severe conditions, i.e., lower temperature and/or shorter time to achieve comparable uniformity and/or density of the final product.

ADDITIVES

In accordance with the invention, drying of certain metal salt solutions, particularly those which supercool at higher concentrations of solute, is enabled, and the drying of others is facilitated by elevation of the freezing point, by the introduction of certain additives into the solution. Such additives include ammonium hydroxide and tetraalkyl ammonium hydroxide, denoted by the generic expression $R_4N^+(OH)^-$, where R is selected from the series consisting of ethyl, methyl, propyl, and butyl (and combinations thereof) and salts of ethylene diamine tetraacetic acid (EDTA) including $NH_4$,Na and K salts.

The beneficial effect of these additives is believed to result from their ability to effect clustering of the metal ions by one or more mechanisms. Such clustering can have a twofold effect. First, by reducing the ability of the individual metal ions to lower the freezing point of the aqueous solution, it can result in a higher freezing point, which simplifies the freezing operation and the maintenance of subliming conditions during drying. Secondly, the clustered ions can serve as nuclei to promote crystallization during freezing of the droplets, thus reducing the tendency of solutions to supercool to a glassy state. Substantial elimination of this supercooled liquid is essential since effective drying of the frozen droplets can be accomplished only by sublimation. Supercooled liquids warmed at a pressure, below that which would correspond to the triple point of the truly frozen crystalline material, will be converted to a less viscous liquid which frustrates the drying operation.

The addition of any amount of additive sufficient to raise the freezing point of the solution achieves a beneficial effect for the purposes of the present invention. The amount of additive should, however, not be so great as to cause any visible precipitation of solute.

Where the pH of the solution is well below neutrality, as it is in the following examples, it is desirable to use an amount of additive such as to produce a pH increase of at least 10 percent, but an amount of additive such as to produce a pH increase of at least 30 percent is preferred for optimum effectiveness.

The following examples illustrate the effects of the inventive additives upon the freeze-drying process for some representative solutions.

EXAMPLE I

Aqueous solutions of ferric sulfate $Fe_2(SO_4)_3$ in various concentrations were prepared, some with additions of $NH_4OH$. Following determination of freezing points and pH, the solutions were sprayed into a basket suspended in liquid hexane at $-76°$ C: the basket containing the droplets was removed and the droplets were placed in a vacuum chamber at a partial pressure of <1 mm Hg and a temperature of $-30°$ C. The temperature was increased to $150°$ C over an 8 hour period. The solution consituents, freezing points, and pH values are shown in Table I.

Table I

| Solution Constituents | | | | |
|---|---|---|---|---|
| | Concentration | Parts by | | |
| Solution Nos. | $Fe_2(SO_4)_3$ (molal) | Volume Solvent | Freezing Pt. (°C) | pH |
| | | $H_2O$ / $NH_4OH$* | | |
| 1 | 0.5 | 1 / — | −6.5 | 0.8 |
| 2 | 0.5 | 1 / .11 | −5.7 | 2.2 |
| 3 | 1.0 | 1 / — | −23.7 | <0.1 |
| 4 | 2.0 | 1 / — | ~−75 | <0.1 |
| 5 | 2.0 | 1 / 1 | −15.0 | 2.2 |

*28.5 wt % $NH_4OH$ in solution.

The above procedure gave the various results shown in Table II.

Table II

| Solution Number | Crystalline Frozen Droplets? | Melting During Drying? |
|---|---|---|
| 1 | yes | yes |
| 2 | yes | no |
| 3 | yes | yes |
| 4 | no | yes |
| 5 | yes | no |

The results indicate that in each case in which $NH_4OH$ was absent from the solution, melting occurred during drying, and in each case in which $NH_4OH$ was present, no melting occurred during drying, and freezing point and pH of the solution were increased. Solution 4 droplets were supercooled to a transparent noncrystalline state by the refrigerant, as indicated by visual inspection and differential thermal analysis. The addition of $NH_4OH$ to Solution 4 resulted in crystallized droplets for Solution 5.

Freeze-dried spheres of a 1.4 molal concentrated solution of ferric sulfate in a solvent made up of equal volumes of water and 28.5 weight percent of aqueous $NH_4OH$, after calcining at $700°$ C for 1 hour, exhibited a bulk density of about 18 percent, compared to a bulk density of about 3 to 5 percent for spheres freeze-dried from 0.3 molal solutions containing no $NH_4OH$ addition, and calcined under the same conditions. Without the additive of the present invention, the freeze drying of the more concentrated solution, which was capable of producing the denser product, was not feasible.

EXAMPLE II

The procedure of Example I was repeated for solutions of $Al(NO_3)_3$. The solution constituents, freezing points, and pH values are shown in Table III.

Table III

| Solution Number | Solution Constituents | | Freezing Pt.(°C) | pH |
|---|---|---|---|---|
| | Wt.% $Al(NO_3)_3$ | Parts by Volume Solvent | | |
| | | $H_2O$ / $NH_4OH$* | | |
| 1 | 54.0 | 1 / — | −25.0 | 1.1 |
| 2 | 54.0 | 1 / .087 | −22.4 | 2.4 |
| 3 | 54.0 | 1 / .17 | −18.2 | 2.6 |
| 4 | 54.0 | 1 / .25 | −17.3 | 2.8 |
| 5 | 72.0 | 1 / — | −32 | 0.7 |
| 6 | 72.0 | 1 / .43 | −21.7 | 2.7 |

*28.5 wt.% $NH_4OH$ in solution.

Again, in each case in which $NH_4OH$ was absent from the solution, melting occurred during drying, and in each case in which the additive was present, no melting occurred during drying, and the freezing point and pH of the solution were increased.

EXAMPLE III

The procedure of Example I was repeated for solutions of ferric chloride containing 4.6 pounds of $FeCl_3$ per gallon of solution. In addition to $NH_4OH$, tetraethyl ammonium hydroxide and the ammonium salt of EDTA were employed as additives. The amounts of solution, additive, and effects of the additive on freezing point and pH are shown in Table IV.

Table IV

| Solution Number | Solution Constituents Parts by Volume | | | Freezing Pt.(°C) | pH |
|---|---|---|---|---|---|
| | Ferric Chloride Solution | $NH_4OH^{(1)}$ | | | |
| 1 | 1 | 0 | | −33.0 | 0.1 |
| 2 | 1 | 0.39 | | −19.0 | 2.0 |
| 3 | 1 | 0.42 | | −17.3 | 2.8 |
| | | $H_2O$ | $(CH_3)_4NOH^{(2)}$ | Freezing Pt.(°C) | pH |
| 4 | 1 | | 0.39 | −19.0 | −1.4 |
| 5 | 1 | 1 | 1 | −7.2 | 1.8 |
| 6 | 1 | | 3 | −5.5 | 1.9 |
| | | Ammonium EDTA Solution$^{(3)}$ | | Freezing Pt.(°C) | pH |
| 7 | 1 | 1 | | −17.0 | 3.5 |

$^{(1)}$28.5 wt% aqueous $NH_4OH$ solution.
$^{(2)}$10 wt% aqueous $(CH_3)_4NOH$ solution.
$^{(3)}$2 grams of EDTA dissolved in 5cc $NH_4OH$ (28.5 wt% $NH_4OH$).

Again, in each case in which the additive was absent from the solution, melting occurred during drying, and in each case in which the additive was present, no melting occurred during drying and the freezing point of the solution was increased.

Other solutions which have been found to require the presence of the inventive additives for the achievement of freeze-drying include yttrium sulfate, chromium sulfate and ferric nitrate solutions. These solutions are but exemplary; any metal salt solution which when subjected to freeze-drying evidences the limitations of supercooling, melting during drying, etc., may benefit from the inventive additives. Evidence of partial melting of the frozen droplets during drying includes (1) a glassy or non-porous coating or core, (2) hollow core, or (3) cracks in the spheres subjected to drying conditions.

The invention has necessarily been described in terms of a limited number of embodiments. Other embodiments will become apparent to those skilled in the art. For example, while the description has sometimes been directed to the production of refractory oxidic bodies, other applications include the use of freeze-dried spheres per se, (or after a thermal treatment to strengthen them, change their size, porosity, etc.) as filter or resin beds, catalyst supports or abrasives.

What is claimed is:

1. The method of freeze drying aqueous solutions of metal salts which comprises freezing such solutions in the form of droplets and removing the solvent from said frozen droplets by sublimation, wherein the improvement comprises incorporating in said solutions, prior to freezing, and in addition to said metal salts, an additive selected from the group consisting of ammonium hydroxide, alkyl ammonium hydroxides wherein the alkyl substituents contain from 1–4 carbon atoms and salts of ethylene diamine tetraacetic acid, which raises the freezing point of said solution and reduces any tendency to supercool.

2. The method of claim 1 wherein the metal salt is selected from the group consisting of chlorides, sulfates and nitrates.

3. The method of claim 2 wherein the additive is ammonium hydroxide.

4. The method of claim 1 wherein the metal is selected from the group consisting of one or more of iron, aluminum yttrium and chromium.

5. A method for forming particulate material of at least one water soluble metal salt, comprising:

freezing droplets of an aqueous solution of said at least one salt within a time period of up to one second by introducing the droplets into a liquid refrigerant, the refrigerant having a volume sufficient to maintain a solution-to-refrigerant volume ratio within the range of 1:2 to 1:100, whereby substantial coalescence of the droplets is avoided during freezing, collecting the frozen droplets at a temperature below the freezing point of the solution, and removing the water from the frozen droplets by sublimation, wherein the improvement comprises adding to the solution prior to freezing at least one additive selected from the group consisting of ammonium hydroxide, tetraalkyl ammonium hydroxide, $R_4N^+(OH)^-$, where R is selected from the group consisting of ethyl, methyl, propyl and butyl, and salts of ethylene diamine tetraacetic acid, the additives being added in an amount below that at which a precipitate of the metal salt is formed, whereby supercooling of the solution droplets during freezing and melting of the frozen droplets during sublimation are substantially avoided.

6. The method of claim 5 in which the solution has initially an acid pH and the additive is added in an amount sufficient to result in at least a 10 percent increase in pH over the initial pH of the solution.

7. The method of claim 6 in which the additive is added in an amount sufficient to result in at least a 30 percent increase in pH over the initial pH of the solution.

8. The method of claim 5 in which the additive is ammonium hydroxide.

* * * * *